United States Patent Office 2,888,739
Patented June 2, 1959

2,888,739

BEARING COMPOSITION

Cord H. Sump, Park Forest, and Carl E. Swartz, Hinsdale, Ill., assignors to Armour Research Foundation of Illinois Institute of Technology, Chicago, Ill., a corporation of Illinois No Drawing. Application June 28, 1955
Serial No. 518,688

6 Claims. (Cl. 29—182.5)

The present invention is concerned with an improved bearing composition, and to a method of manufacturing the same.

The bearing elements produced according to the present invention have particular applicability for use as journal bearings or as thrust bearings, in oxygenated water at temperatures in the range from about 200° to 500° F. and under elevated pressures, but they also have general applicability to bearings in any environment.

The properties of water at elevated temperatures present particular problems in the selection of suitable bearing materials. At elevated temperatures, water has a low viscosity which materially decreases the effectiveness of lubricating films. Furthermore, at these temperatures, water presents unusual corrosion problems, presumably due to the fact that water is much more highly ionized at these temperatures and tends to exhibit greater chemical activity. Hence, the design of bearings operating in hot water requires an entirely different approach than that used for conventional bearings. First of all, the selected material must maintain a water film as a lubricant. In some cases, the bearing must also have high impact resistance. This consideration necessarily limits the use of pure graphite bearings which otherwise might be acceptable for use with a water film lubricant. Finally, the bearing material must be able to withstand the extended corrosive attack occurring at the temperature of operation.

Accordingly, an object of the present invention is to provide an improved bearing composition particularly suitable for use in an environment of hot water.

Another object of the present invention is to provide a bearing composition having high impact resistance, good wearing qualities, good compressive strength, and high corrosion resistance.

A still further object of the invention is to provide a method for making a bearing element having the described characteristics.

The bearing material of the present invention includes a matrix which is reasonably ductile, has a high impact resistance, good wearing qualities, good bearing strength, and high corrosion resistance when used in an environment of hot water. We have now found that a matrix of cobalt and chromium containing up to 35% by weight of chromium and having dispersed therein carbon particles in an amount of up to about 70% by volume meet all these requirements.

The chromium in the matrix provides an increased corrosion resistance, and has the important function of promoting the formation of a passive surface oxide on the bearing element. Generally, the chromium content of the matrix should be about 20 to 30% by weight, with the balance consisting essentially of cobalt (and the usual impurities). At chromium contents less than about 20% the corrosion resistance is usually not so high as desired. At chromium contents substantially in excess of about 30%, the material which results is rather brittle.

The carbon provides the anti-seizure, non-galling qualities to the composition. If a momentary weld should occur between the bearing and its mating members, a catastrophic failure does not occur because the carbon present at the surface serves to interrupt the progress of the galling across the bearing surface.

The amount of carbon to be added is preferably not more than 70% by volume, although as high as 80% by volume can be used. A preferred range is from 40 to 60% by volume of the final bearing element.

The bearing elements of the invention are prepared most conveniently by powder metallurgy methods and techniques, starting with a mixture of cobalt powder of about 300 mesh, chromium powder of the same particle size, and carbon particles having an average size in the range from about 70 mesh to about 100 mesh. As one alternative, the cobalt and chromium may be pre-alloyed and then reduced to powder form by well known processes.

Specifically, we prefer to hot press a powdered mixture of the two metals and carbon at a temperature of at least 2000° F. and preferably about 2200° F., and a pressure of at least 5000 lbs. per square inch, and preferably of 6000 lbs. per square inch. Under the preferred conditions, about 10 minutes' time is sufficient to sinter the matrix and cause any carbide formation by the reaction of the metal with the free carbon. After cooling, the pressed blank is machined to shape, with the final machining being accomplished by grinding in order to prevent smearing the matrix metal over the carbon on the wearing surfaces.

The carbon employed is preferably an amorphous carbon or graphite of a low sulphur content and may be a calcined petroleum pitch base coke or other form of carbon having a low volatiles content.

Impact tests were made on the samples with a modified Sonntag Universal Impact testing machine with special specimen holders. The specimen size was standardized at 7/8 inch diameter and 3/8 inch thick. The specimen was supported vertically and broken at its mid-section by an Izod hammer adjusted for the 25 ft. pound scale.

The mechanical properties of various compositions produced according to the present invention, as compared with graphite, are given in the table below:

Table

| Material | Metal, percent by weight | Metal, percent by volume | Average impact strength, ft.-lb. | Average compressive strength, p.s.i. |
|---|---|---|---|---|
| Graphite | | | 1.00 | |
| Co–Cr–C | 60.5 | 30.1 | 6.75 | 21,800 |
| Co–Cr–C | 84.8 | 60.6 | 25.5 | |
| Co–Cr–C | 87.4 | 66.1 | [1] 60 | 86,800 |

[1] Specimen did not fracture.

The bearing properties of the products were tested in the following manner. The bearing in the form of a thin shell was press fitted in a stainless steel retainer. Weights on an attached arm extending through the bottom of the container loaded the bearing. A belt driven pulley mounted on the journal provided the driving force.

When tested in the above apparatus, bearing specimens produced according to the present invention ran for 100 hours in water at a temperature of 200° F., under a maximum load of 48 p.s.i. At the end of this one hundred hour test, there was no measurable wear on either the bearings or the journals. The water also was clean and gave no evidence of corrosion.

Bearing elements produced according to the present invention and containing about 70% cobalt, 30% chromium, and having a carbon content in the range from about 40 to 60% by volume having a specific gravity varying between about 3.9 and 4.15 and a metal binder hardness of about 42 to 45 Rc.

The microstructure of the cobalt-chromium-carbon composite indicates that the carbon particles are more or less uniformly dispersed throughout the cobalt-chromium alloy matrix and bonded through carbides that are formed between the metals and the carbon. The temperature and pressure conditions are also such as to cause incipient fusing, or sintering, of the metals to give a bonded matrix.

The homogeneity of the specimens is improved if, during the process of formation, the metals and carbon powder are mixed with a small amount of a light oil to prevent the metals from gravitating during the mixing process.

From the foregoing, it will be apparent that the bearing materials of the present invention are well suited to use in hot water, or in other applications where other materials would fail completely. The bearing materials in the invention combine the features of relatively high impact resistance, good wearing qualities, good bearing strength, and high corrosion resistance.

It will be evident that various modifications can be made of the described embodiments without departing from the scope of the present invention.

We claim as our invention:

1. A bearing element comprising a sintered cobalt-chromium matrix containing about 20 to 30% by weight chromium and the balance consisting essentially of cobalt, said matrix having dispersed therein carbon particles in an amount from 40 to 60% by volume of said element.

2. A bearing element comprising a sintered cobalt-chromium matrix containing about 20 to 30% by weight chromium and the balance consisting essentially of cobalt, said matrix having dispersed therein carbon particles in an amount from 40 to 60% by volume of said element, said carbon particles having an average size in the range from 70 mesh to 100 mesh.

3. A bearing element comprising a sintered cobalt-chromium matrix having a cobalt content of about 70% by weight and a chromium content of about 30% by weight, said matrix having dispersed therein carbon particles in an amount from 40 to 60% by volume of said element.

4. A compact comprising a sintered cobalt-chromium matrix containing chromium in amounts not in excess of 35% by weight and having dispersed therein carbon particles in amounts of from 40% to 80% by volume of said compact.

5. A sintered cobalt-chromium matrix containing about 20 to 30% by weight chromium and the balance consisting essentially of cobalt, said matrix having dispersed therein carbon particles in an amount of from 40% to 80% by volume of said matrix.

6. A bearing element comprising a sintered cobalt-chromium matrix containing about 20 to 30% by weight chromium and the balance consisting essentially of cobalt, said matrix having dispersed therein carbon particles in an amount of from 40% to 80% by volume of said element, said carbon particles having an average size between about 70 mesh and 100 mesh.

References Cited in the file of this patent

UNITED STATES PATENTS

| | | |
|---|---|---|
| 1,177,407 | Gilson | Mar. 28, 1916 |
| 1,556,658 | Williams | Oct. 13, 1925 |
| 2,253,476 | Wirth | Aug. 19, 1941 |
| 2,362,701 | Koehring | Nov. 14, 1944 |
| 2,561,583 | Marvin | July 24, 1951 |